Patented Sept. 3, 1946

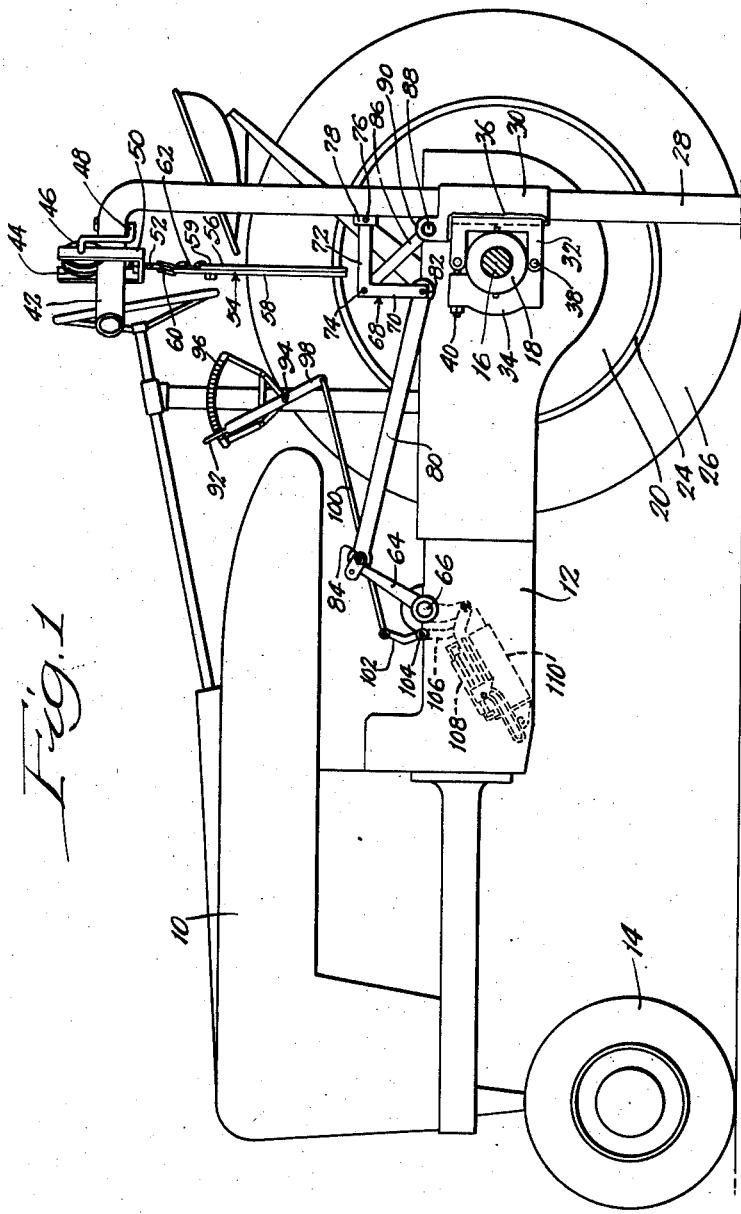

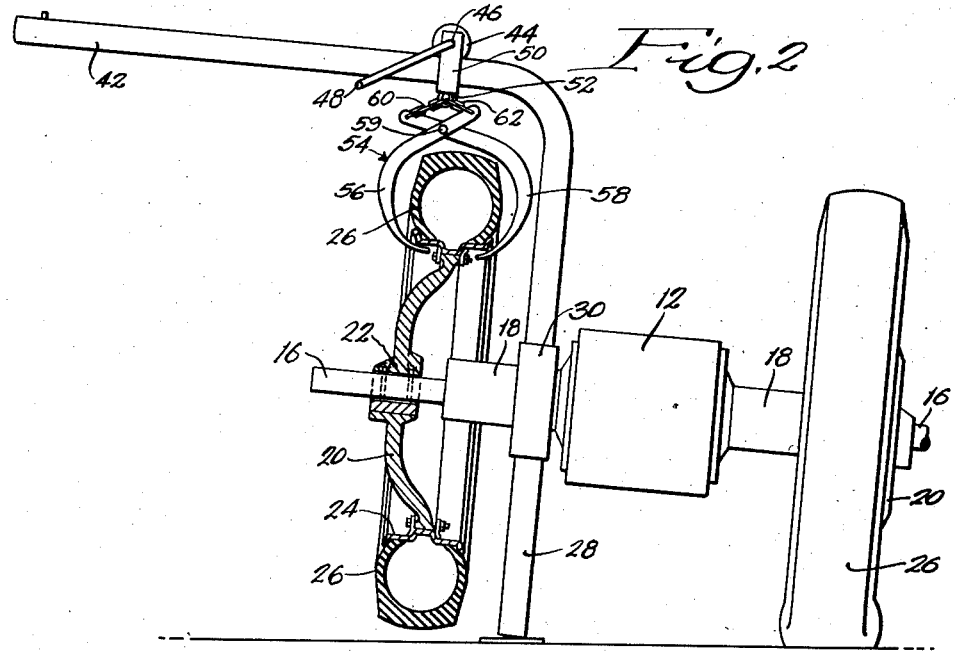
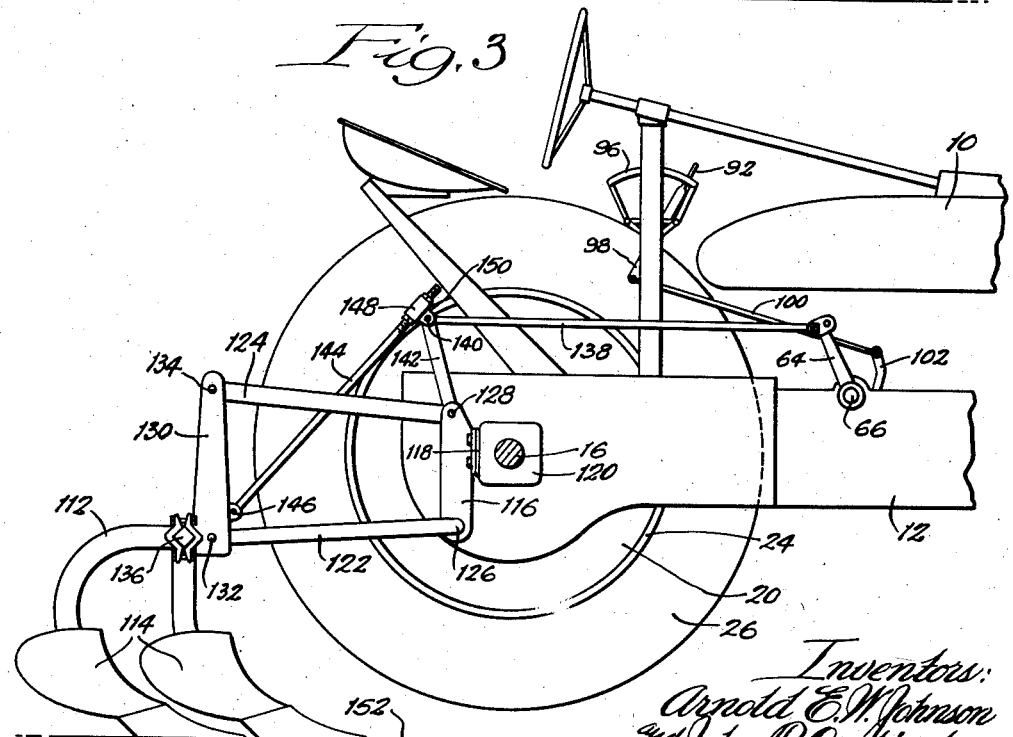

2,407,080

UNITED STATES PATENT OFFICE 2,407,080

JACK

Arnold E. W. Johnson, Oak Park, and John R. Orelind, Wilmette, Ill., assignors to International Harvester Company, a corporation of New Jersey Application March 8, 1943, Serial No. 478,462

2 Claims. (Cl. 254—86)

This invention relates to a new and improved tractor jack with finger-tip control and is an improvement over pending applications having Serial No. 472,610, filed January 16, 1943, for "Repair apparatus for vehicles," now Patent No. 2,380,313 of July 10, 1945, and Serial No. 466,463, filed November 21, 1942, for "Power adjusting mechanism," both of these and the subject application being assigned to the common assignee, International Harvester Company.

It is an important object of this invention to provide a jack especially adapted for tractors or the like and which is actuated by power supplied from the tractor.

Jacks are employed on tractors and other vehicles of this nature for the several purposes of varying the wheel spread, to switch the wheels, or to make tire repairs. A tractor is generally a very heavy vehicle, and the wheels employed thereon are of a size incapable of being handled conveniently. As disclosed in our previous application entitled "Repair apparatus for vehicles," having Serial No. 472,610, the jacks shown therein were capable of lifting the tractor wheel from the ground and in addition supplied a means of removing the raised wheel from its position on the tractor axle. The other application mentioned above, namely, "Power adjusting mechanism," having Serial No. 466,463, is directed chiefly to the hydraulic mechanism employed for the purpose of making available accurate finger-tip control for the tractor power lift means. One of the requirements of a tractor jack is that it be capable of lifting within minute predetermined limits, and, inasmuch as the jack is directly operated by the tractor power take-off lever, it is necessary to have complete control over the amount of movement of this power take-off lever. To this end, the finger-tip control lever is positioned within reach of the tractor operator and the controls are so calibrated that a specific movement of the finger-tip lever will cause a corresponding movement of the power take-off lever. In the past, power take-off levers associated with tractors were not capable of accurate intermediate stopping and quite often were only capable of full movement between their extreme operating positions.

Therefore, a further important object of this invention is the provision of a tractor jack in combination with a finger-tip control which causes the jack to be locked in any position.

Other and further important objects of this invention will become apparent from the disclosures in the following specification and accompanying drawings, in which:

Figure 1 is a side elevation of a tractor incorporating the tractor jack with finger-tip control;

Figure 2 is a rear elevational view of the structure shown in Figure 1, the view showing one of the wheels in section; and Figure 3 is a view similar to Figure 1 of a combined jack and implement.

As shown in the drawings, reference numeral 10 indicates generally a tractor of the usual type having a chassis 12 upon which is mounted a forward wheel 14 and a pair of rear axles 16. The rear axles 16 are journaled within bearing members 18 and support large wheels 20, which ordinarily accompany agricultural tractors.

The wheels 20 are of the concavo-convex disk type having a hub portion 22, as best shown in Figure 2, and an outer rim member 24 of the drop-center type. It is, of course, understood that this wheel and assembly may be of any construction desired and not necessarily as shown. A pneumatic tire 26 is mounted on the rim member 24.

It will be noted that the axle members 16 are elongated and permit various wheel spreads simply by attaching the hub portion 22 of the wheel at any point along the length of the axle 16. These tractor wheels are quite large and cumbersome and are much too great a load for a single individual to lift, as is necessary when the wheels are repositioned at some new point on their axles or entirely removed for the several purposes of changing sides, turning the wheel around so that the curved portion of the wheel is opposite to its initial placement, or to remove the wheel to make tire repairs. A jack, as shown in our previous application having Serial No. 472,610, and mentioned above, comprises a vertical standard 28, which is slidably journaled within a sleeve member 30 clamped around the axle housing 18 by means of a pair of opposed, C-shaped clamps 32 and 34. The clamp member 32 is welded or otherwise rigidly attached to the sleeve 30 at 36 and has hinged thereto at 38 the opposing clamp member 34. An adjustable bolt 40 permits the upper portions of the clamp members 32 and 34 to be drawn tightly together so as to be firmly attached to the axle housing 18. The jack further includes a horizontal extension 42 of the standard 28, which acts as a boom for the reception of a roller 44 having a shaft 46 therethrough terminating in a crank 48. A bail 50 is carried by the shaft 46 and has its bight portion disposed below the boom 42 provided with an eye-bolt 52. The means for connecting the bail 50 to the tire and wheel assembly or to the tire alone preferably takes the form of a pair of tongs 54 comprising elements 56 and 58. These tongs 56 and 58 are best shown in Figure 2, wherein they are in engagement with the rim 24 of the wheel 20. It will also be noted that the pivot 59 between the elements 56 and 58 is directly below the roller 44 and that the vertical line between these two points is laterally offset toward the concavity of the wheel 20. The arms of the elements 56 and 58 extend beyond the intersection thereof and are connected to the eye-bolt 52 preferably by means of a pair of flexible chains 60 and 62. The chain 62 is somewhat shorter than the chain 60, thus assisting in the lateral offset location of the tong assembly with respect to the wheel assembly. Turning of the crank 48 causes the carrier assembly to move laterally inwardly or outwardly on the boom 42 and, when the wheel 20 is loosened from the axle 16, the wheel assembly is carried along. As will be seen in Figure 2, the boom 42 is sufficiently long so that the wheel assembly may be entirely removed from the axle 16, in which position it may be removed from the tractor or retained in its carried position and spun around and reengaged with the axle 16 opposite to its original position now having the concave side of the wheel positioned outwardly.

The jack is operated by means of a power lift arm 64, which is regular equipment on agricultural tractors of the type shown, and such an arm is positioned on both sides of the tractor. As shown in Figure 1, the arm 64 pivots about the shaft 66, which is journally supported within the chassis 12. The arm 64 is ordinarily capable of movement through an angle of approximately 180°, and it is the utilization of this movement that is here adapted to operate the jack. Many mechanical means may be employed between the arm 64 and the jack to cause the chassis 12 and the sleeve 30 to move reciprocably on the jack standard 28. The particular method shown is merely one of many forms which are shown in more detail in our previously filed case entitled "Repair apparatus for vehicles" and already mentioned herein. A bell-crank lever 68 has angularly spaced arms 70 and 72 joined by the fulcrum 74. The arm 72 is pivotally attached at 76 to an apertured lug 78 on the vertical standard 28. The arm 70 is pivotally attached to a connecting rod 80 at 82, and the arm at its other end is pivotally attached to the arm 64 at 84. A link 86 pivotally connects the fulcrum 74 of the bell-crank 68 to the pivot point 88 on the lug 90, which is an integral part of the sleeve 30. The levers, as just described, may be a single set or may be arranged in pairs to increase the strength of the jack.

Heretofore, mechanisms have been employed to actuate the power-lift arm 64, but most of these have been restricted to full movement of the arm between its extreme end positions, and generally no provision was made for intermediate stops of the arm. If intermediate stops of the power-lift arm were available, no accurate means were ever provided to stop the arm at some predetermined desired position. The above mentioned application on "Power adjusting mechanism," Serial No. 466,463, sets forth an easily operated finger-tip lever which, upon being moved through its arcuate range, causes an equal arcuate movement of the power arm 64. Provision is made in that mechanism for providing positive locking means of the arm 64 at whatever point the finger-tip lever is stopped. A like finger-tip lever 92 is pivoted at 94 and is capable of moving across the arcuate scale 96, which is accurately calibrated and positioned in close proximity to the operator of the tractor so that he may easily make any desired movement of this finger-tip control lever 92. An extension 98 of the lever 92 beneath the pivot point 94 engages a link arm 100, which in turn pivotally engages an arm 102 and pivots it about a point 104 so that a lower end 106 of the arm 102 controls a valve actuating means including a member 108 associated with an hydraulically operated device including a cylinder member 110. The member 108 is so adjusted that a movement of the finger-tip lever 92 causes an opening or closing thereof and permits greater or less movement of the piston (not shown) within the hydraulic cylinder 110. Movement of the piston causes a direct movement of the arm 64. Provision is also made within this hydraulic mechanism to positively lock the piston in its ultimately assumed position, as determined by operation of the valve 108 by the finger-tip lever 92.

The combining of the finger-tip control with the tractor jack, as disclosed herein, is novel inasmuch as it produces a long sought-after device capable of much greater precision as required for tractor jacks in order that they be used successfully. It is now possible to accurately raise one wheel of the tractor to any predetermined height. Such a condition is very desirable inasmuch as the tractor wheels are so very heavy it is necessary, when mounting or dismounting them, to have the axle at the exact height for sliding of the wheel on or off without the necessity of lifting it. The calibrated finger-tip control enables the operator to adjust the axle at just this proper height. Certainly the devices that were limited only to full arcuate movement of the power-lift arm were not adapted to the operation of tractor jacks, nor were the devices that were capable of intermediate stopping of the power arm to be successfully utilized with a tractor jack, for the reason that the axle height could not be adjusted to any predetermined height without much running back and forth in attempting to get the power arm in the right position. It is to be understood, of course, that specific details of the type of power-operated mechanism are not disclosed, because they are not an integral part of this invention, but rather any device that permits accurate finger-tip control of the power-lift arm will suffice. For details of such a device, see the above mentioned application having Serial No. 466,463.

Figure 3 shows a cultivating implement 112 having earth-working tools 114, which are adapted to penetrate relatively soft ground and so prepare it for proper crop raising. The implement 112 is directly mounted on the tractor 10 somewhat similarly to the mounting of the jack standard, as shown in Figure 1. A bracket 116 is attached at 118 to an axle housing 120, shown as a square in cross section in contradistinction to the circular housing 18 shown on the tractor in Figure 1. A pair of lever arms 122 and 124 are pivoted respectively to the lower and upper portions of the bracket 116 at 126 and 128. The other ends of the arms 122 and 124 are pivoted to a bracket 130 at the points 132 and 134, respectively. The cultivator 112 is bolted or otherwise attached to the shaft 136, which forms a unitary part of the vertical bracket 130. A link arm 138, connected to the arm 64 at one end, pivots about a point 140, which point forms an arc described by a connecting link 142 pivotable about its lower end at the point 128 on the bracket 116. A link arm 144 interconnects the bracket 130 by connection at a point 146 with the arms 138 and 142 at their pivot point 140. A sleeve 148 is slidably adjustable along the length of the link arm 144 and has an integral bracket 150, which is adapted to receive a pin through an aperture therein at the point 140 to thereby join the three members 138, 142, and 144. The depth that the cultivator is capable of attaining is controlled by adjusting the sleeve 148 either higher or lower on the link arm 144.

As shown in Figure 3, the ground level is at 152, and the tractor wheel 20 is raised therefrom. This condition has arisen, because the ground 152 is so hard that the cultivator tools 114 cannot penetrate and, inasmuch as there is a direct linkage connection between the power-lift arm 64 and the tools 114, the tractor itself then raises. Hence, this cultivator implement acts in place of a jack when used on ground hard enough to prevent penetration of the cultivator tools. Generally, ordinary earth is not packed solidly enough to resist penetration of implement tools, so the tractor is run onto some hard flooring, such as concrete or the like, and the finger-tip lever 92 moved along its arcuate scale to any desired point, and the rear wheels of the tractor are thereby raised or lowered, as required. It will be seen that the implement performs all the functions of the jack disclosed in Figures 1 and 2, except for the lifting and carrying of the wheel by means of the tongs 54 suspended from the boom 42.

Heretofore, resilient means have been employed intermediate the direct linkage connection between the power-lift arm 64 and the implement tools 114, so that, upon actuation of the arm 64 when the tractor is raised on some firm support, the linkage could be reduced in length to prevent injury of the tools. In the construction shown in Figure 3, such resilient or yieldable member has been entirely removed so that the tools do not "give," and the result will be a lifting of the rear end of the tractor.

We have developed a practically operable tractor jack capable of commercial adaptation for the sole reason that it is provided in combination with the finger-tip control, permitting operation thereof in minute increments, and we do not intend limiting the patent granted thereon otherwise than as necessitated by the appended claims.

What is claimed is:

1. In a tractor having a power source comprising a swingable work arm, a hydraulic device adapted to cause swinging movement of said work arm, a control lever, actuating means associated with said hydraulic device, linkage between said control lever and said actuating means, the tractor having a jack means, said jack means comprising a standard, sleeve means affixed to the tractor through which said standard slides, a bell-crank lever having angularly spaced arms and a fulcrum therebetween, the arms connecting the said standard to said work arm, and a link pivotally attached to said sleeve means and the fulcrum of said bell-crank lever, whereby movement of the control lever causes the tractor to be raised or lowered with respect to said standard.

2. In a tractor having a power source comprising a swingable work arm, a control lever for effecting regulated movement of said work arm by said power source, a jack means for the tractor, said jack including a standard, sleeve means affixed to the tractor and forming a rigid structure therewith through which the standard slides, a bell-crank lever having angularly spaced arms and a fulcrum therebetween, the arms connecting the standard to the work arm, and a link pivotally attached to said rigid structure and the fulcrum of the bell-crank lever, whereby movement of the control lever causes the tractor to be raised or lowered with respect to said standard.

ARNOLD E. W. JOHNSON.
JOHN R. ORELIND.